(12) United States Patent
Dokonal et al.

(10) Patent No.: US 10,491,087 B2
(45) Date of Patent: Nov. 26, 2019

(54) METHOD OF MANUFACTURING A ROTOR FOR AN ELECTRIC MOTOR FOR A WASHING MACHINE

(71) Applicant: Whirlpool Corporation, Benton Harbor, MI (US)

(72) Inventors: Luiz V. Dokonal, Joinville (BR); Evandro J. Meurer, Joinville (BR); Orlando Starke, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 1225 days.

(21) Appl. No.: 14/043,059

(22) Filed: Oct. 1, 2013

(65) Prior Publication Data

US 2015/0089794 A1    Apr. 2, 2015

(51) Int. Cl.
*H02K 15/03*    (2006.01)

(52) U.S. Cl.
CPC ........ *H02K 15/03* (2013.01); *Y10T 29/49012* (2015.01)

(58) Field of Classification Search
CPC ...... H02K 15/03; H02K 1/2786; H02K 15/00; H02K 15/14; Y10T 29/49012
USPC .................................................. 29/596, 598
See application file for complete search history.

(56) References Cited

U.S. PATENT DOCUMENTS

| | | | | |
|---|---|---|---|---|
| 2,456,457 A * | 12/1948 | Somerville | ......... | H01F 27/2455 336/212 |
| 2,958,019 A * | 10/1960 | Scholten | ............. | B23Q 3/1546 335/285 |
| 3,710,291 A * | 1/1973 | Nicoud | ................. | H01F 7/0215 335/306 |
| 4,102,040 A * | 7/1978 | Rich | ........................ | H02K 1/16 29/596 |
| 4,272,741 A * | 6/1981 | Vanderknyff | ............ | H03H 7/30 29/607 |
| 4,309,815 A * | 1/1982 | Schmitt | ..................... | H02K 1/17 29/596 |
| 4,365,180 A * | 12/1982 | Licata | ...................... | H02K 1/26 29/598 |
| 4,525,925 A * | 7/1985 | Jones | ..................... | H02K 1/276 29/598 |
| 5,298,827 A * | 3/1994 | Sugiyama | .............. | H02K 1/278 310/156.28 |
| 5,489,811 A * | 2/1996 | Kern | ........................ | H02K 1/16 29/596 |
| 5,682,670 A * | 11/1997 | Bell | .................... | H01F 41/0253 156/222 |
| 6,201,324 B1 * | 3/2001 | Suzuki | .................. | H02K 1/145 29/596 |
| 6,610,415 B2 * | 8/2003 | Koslow | ..................... | B32B 5/16 148/105 |
| 6,768,407 B2 | 7/2004 | Kohda et al. | | |

(Continued)

*Primary Examiner* — Peter Dungba Vo
*Assistant Examiner* — Kaying Kue
(74) *Attorney, Agent, or Firm* — Price Heneveld LLP (57) ABSTRACT

A method of manufacturing a rotor of an electric motor is disclosed. The method includes securing a plurality of permanent magnets to a sheet to form a magnet chain, bending the sheet to engage an inner surface of each permanent magnet with a curved outer surface of an insert mold, wrapping a metallic strip around an outer surface of the sheet to form a yoke of the rotor, and molding a polymeric material over the magnet chain and the yoke to form a cylindrical shell.

16 Claims, 5 Drawing Sheets

(56) References Cited

U.S. PATENT DOCUMENTS

| | | | |
|---|---|---|---|
| 6,858,962 B2 | 2/2005 | Post | |
| 6,903,475 B2* | 6/2005 | Ortt | H02K 1/17 |
| | | | 310/154.07 |
| 7,053,508 B2 | 5/2006 | Kusase et al. | |
| 7,352,096 B2 | 4/2008 | Dunn et al. | |
| 7,737,594 B2 | 6/2010 | Abe et al. | |
| 8,053,942 B2 | 11/2011 | Abe et al. | |
| 8,183,731 B2 | 5/2012 | Epstein et al. | |
| 2006/0055263 A1* | 3/2006 | Kim | H02K 1/2773 |
| | | | 310/156.08 |
| 2007/0062543 A1* | 3/2007 | Bastian, II | B64C 27/20 |
| | | | 128/844 |
| 2009/0121073 A1* | 5/2009 | Doane | B64C 29/0025 |
| | | | 244/12.5 |
| 2009/0167103 A1* | 7/2009 | Jansen | H02K 1/278 |
| | | | 310/156.48 |
| 2009/0284096 A1* | 11/2009 | Katagiri | H02K 1/148 |
| | | | 310/216.001 |
| 2010/0127590 A1* | 5/2010 | Metral | H02K 1/17 |
| | | | 310/154.15 |
| 2010/0164308 A1* | 7/2010 | Zapf | H02K 15/03 |
| | | | 310/45 |
| 2010/0307202 A1 | 12/2010 | Maentele et al. | |
| 2010/0320858 A1 | 12/2010 | Ishikawa et al. | |
| 2011/0140564 A1* | 6/2011 | Nomura | H01F 41/041 |
| | | | 310/208 |
| 2012/0098370 A1* | 4/2012 | Pinneo | F16F 15/305 |
| | | | 310/90.5 |
| 2013/0270956 A1* | 10/2013 | Yamaguchi | H02K 1/27 |
| | | | 310/156.27 |
| 2014/0215807 A1* | 8/2014 | Kie | H02K 15/03 |
| | | | 29/598 |

* cited by examiner

METHOD OF MANUFACTURING A ROTOR FOR AN ELECTRIC MOTOR FOR A WASHING MACHINE

TECHNICAL FIELD

The present disclosure relates generally to an electric motor for a washing machine, and, more particularly, to a method of manufacturing a rotor for an electric motor for a washing machine.

BACKGROUND

A washing machine is a domestic appliance for cleaning clothes, linens, and other laundry. A washing machine may include a tub and a drum positioned in the tub that is sized to receive laundry for cleaning. The washing machine may include an electric motor that causes the drum to rotate relative to the tub during a washing operation. In some washing machines, the electric motor may be connected to the drum via a transmission system including, for example, belts and pulleys. The electric motor may also be connected to the drum via a drive shaft. Washing machines including the latter type of electric motor are often referred to as "direct drive" washing machines.

Electric motors typically include a stator and a rotor configured to rotate relative to the stator. The stator may be fixed to the tub of the washing machine and may include a number of stator coils. The rotor includes one or more magnets that interact with the stator coils. During operation, the stator coils may be sequentially energized with electricity to cause the rotor to rotate. In a direct drive washing machine, the rotor may be torsionally secured to the drive shaft so that drive force may be transferred to the drum via the drive shaft.

Permanent magnet rotors with ferrite magnets have a limited amount of torque that can be delivered per a defined dimension. In order to maximize torque, any several factors may be modified, and one factor that may be modified is the magnetic flux produced by the rotor magnets. One way of improving the magnetic flux is to use an array of Halbach magnets. The physical disposition of different orientation of magnets in a Halbach array may boost the magnetic flux generated, compared with a regular disposition of magnets, by augmenting the magnetic field on one side of the array while reducing or canceling the field on the opposite side of the array.

SUMMARY

According to one aspect of the disclosure, a method of manufacturing a rotor for an electric motor is disclosed. The method includes securing a plurality of permanent magnets to a sheet to form a magnet chain, bending the sheet to engage an inner surface of each permanent magnet with a curved outer surface of an insert mold, wrapping a metallic strip around an outer surface of the sheet to form a yoke of the rotor, and molding a polymeric material over the magnet chain and the yoke to form a cylindrical shell.

In some embodiments, the magnet chain may include a first permanent magnet having a first magnetic field, a second permanent magnet having a second magnetic field that may have an orientation different from the first permanent magnet, and a third permanent magnet positioned between the first permanent magnet and the second permanent magnet. The third permanent magnet may have a third magnetic field perpendicular to the first magnetic field and the second magnetic field.

In some embodiments, the magnet chain may form a Halbach array of magnets. In some embodiments, securing the plurality of permanent magnets to the sheet may include positioning each magnet in contact with an adhesive on the sheet. Additionally, in some embodiments, the sheet may be formed from a non-ferromagnetic material. In some embodiments, securing the plurality of permanent magnets to the sheet may include defining a space between a first set of magnets and a second set of magnets.

In some embodiments, the method may include positioning the sheet in a frame having a plurality of spacers, and defining the space between the first set of magnets and the second set of magnets may include inserting the spacer between the first set and the second set. In some embodiments, the space may be in a range of 2 and 3 millimeters.

Additionally, in some embodiments, defining the space between the first set of magnets and the second set of magnets may include positioning a spacer between the first set of magnets and the second set of magnets. In some embodiments, the first set of magnets may include six magnets.

In some embodiments, the yoke may include multiple layers of the metallic strip. In some embodiments, the metallic strip may have a thickness in a range of 0.5 and 1.0 millimeters. The yoke may have a thickness in a range of 3 to 5 millimeters.

In some embodiments, the magnet chain and the yoke may cooperate to define an annular ring. Additionally, molding the polymeric material over the magnet chain and the yoke may include molding the polymeric material over a hub positioned at a center of the annular ring.

In some embodiments, the hub may include a plurality of teeth configured to receive a drive shaft of the electric motor.

In some embodiments, the sheet may be formed from a ferromagnetic material. Additionally, in some embodiments, bending the sheet to engage the inner surface of each magnet with the curved outer surface of the insert mold may include defining a space between a first set of magnets and a second set of magnets.

In some embodiments, defining the space between the first set of magnets and the second set of magnets may include positioning a spacer that extends from the curved outer surface of the insert mold between the first set of magnets and the second set of magnets.

According to another aspect, a method of manufacturing a rotor includes securing a plurality of magnets to a sheet to form a Halbach magnet array, engaging an inner surface of each of the plurality of magnets with a curved outer surface of an insert mold, bending a metallic strip to engage an outer surface of the sheet, and molding a polymeric material over the magnets and the metallic strip to form the rotor.

According to yet another aspect, a method of manufacturing a rotor includes attaching a first number of magnets to a first sheet to form a first magnet chain, attaching a second number of magnets to a second sheet to form a second magnet chain, bending the first sheet to engage an inner surface of each magnet of the first magnet chain with a curved outer surface of an insert mold, bending the second sheet to engage an inner surface of each magnet of the second magnet chain with the curved outer surface of the insert mold, wrapping a metallic strip around the first sheet and the second sheet, and molding a polymeric material over the first magnet chain, the second magnet chain, and the metallic strip to form a cylindrical shell.

In some embodiments, the method may include positioning a spacer that extends from the curved outer surface of the insert mold between the first magnet chain and the second magnet chain.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
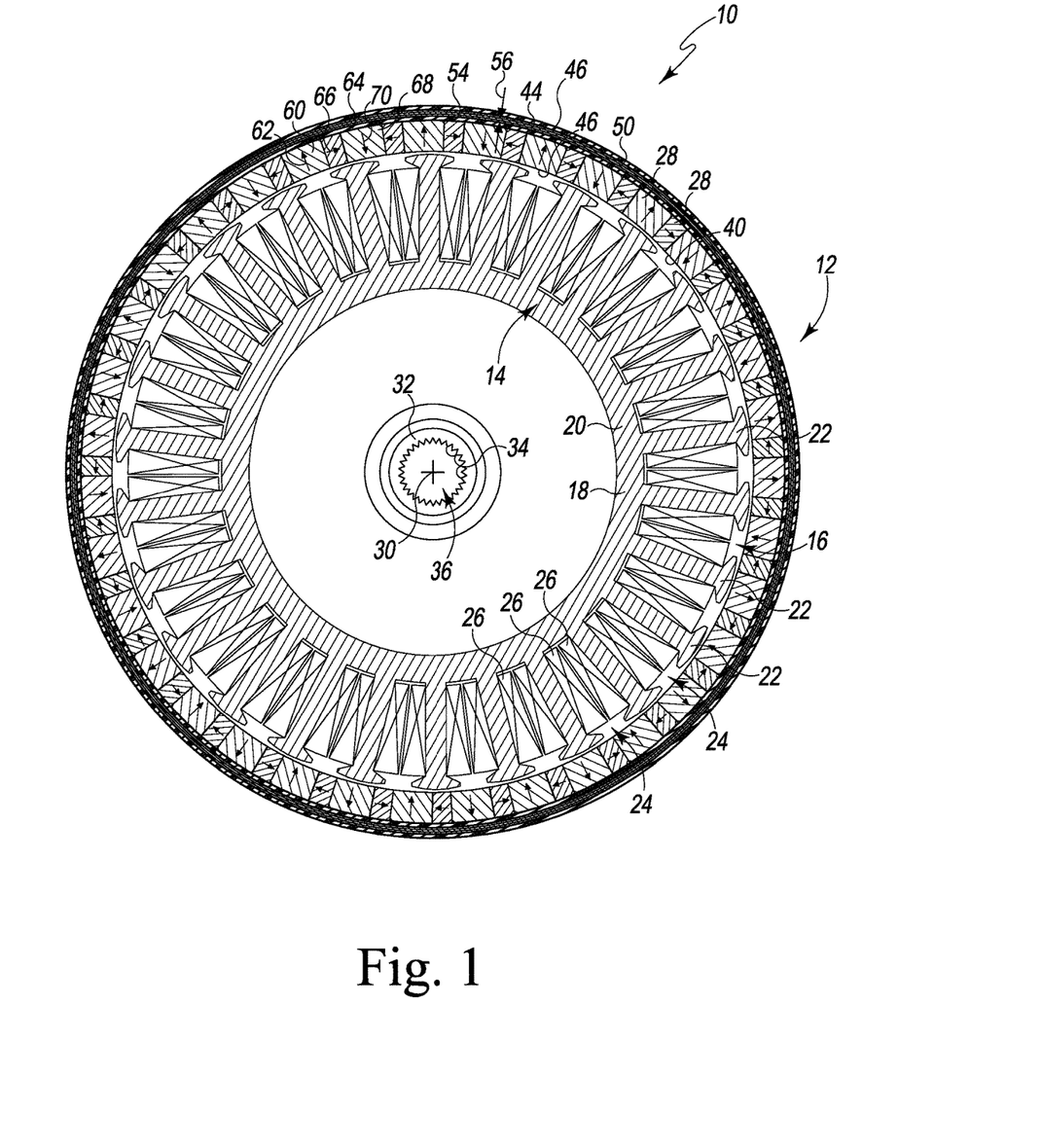
FIG. 1 is a front cross-sectional elevation view of an electric motor.

Referring now to FIG. 1, an electric motor 10 is shown. One example of an electric motor is shown and described in U.S. Patent App. Pub. No. 2010/0307202, entitled "WASHING MACHINE WITH A DIRECT DRIVE SYSTEM," which is incorporated herein by reference. The electric motor 10 includes a rotor 12 and a stator 14 positioned in an opening 16 within the rotor 12.

The stator 14 includes a core 18 that is positioned within a polymeric outer shell (not shown). The core 18 includes a stator yoke 20 and a plurality of teeth 22 extend radially outward from the yoke 20. A slot 24 is defined between each tooth 22. As shown in FIG. 1, the stator 14 includes a number of field coils 26, and each field coil 26 is wrapped around a corresponding tooth 22. In operation, the field coils 26 are energized selectively to generate magnetic fields around the teeth 22. As the field coils are energized, the end pieces of teeth 22 function as electromagnets that interact with the permanent magnets 28 of the rotor 12 to cause the rotor 12 to spin about a rotational axis 30.

In the illustrative embodiment, the rotor 12 is an outer rotor and the stator 14 is an inner stator, which is positioned in the center of the electric motor 10 and surrounded by the rotor 12. As a result, the teeth 22 of the stator core 18 extend radially outward from the rotational axis 30 and the magnets 28 of the rotor 12 face inward toward the axis 30. It should be appreciated that in other embodiments the stator may be an outer stator that surrounds an inner rotor located in the center of the electric motor. In such embodiments, the teeth of the stator core extend radially inward toward the rotational axis while the permanent magnets of the rotor face outward toward the teeth.

The permanent magnets 28 of the rotor 12 are arranged circumferentially around the axis 30, and the rotor 12 includes a hub 32 that defines the rotational axis 30. In the illustrative embodiment, the hub 32 is formed from a metallic material such as, for example, stainless steel or aluminum. In other embodiments, the hub 32 may be formed from a polymeric material, such as, for example, a plastic resin. The hub 32 includes a cylindrical passageway 36 and a plurality of splines 34 that extend into the passageway 36. The splines 34 are configured to engage a drive shaft (not shown) to couple the rotor 12 to the drive shaft.

As shown in FIG. 1, the passageway 36 defines the rotational axis 30 of the rotor 12. When the rotor 12 is secured to the drive shaft, the splines 34 engage the drive shaft of the electric motor such that the rotor 12 may be torsionally secured to the drive shaft. In that way, rotation of the rotor 12 about the axis 30 causes rotation of the drive shaft of the motor.

As described above, the permanent magnets 28 of the rotor 12 face inward toward the axis 30 and hence the stator teeth 22. Each magnet 28 has an inner face 40 that cooperates with the inner faces of the other magnets 28 to define an inner surface 42 of the rotor 12 and hence the inner diameter of the rotor 12. The rotor 12 also includes a back iron or yoke 44 that is positioned adjacent to the outer surfaces 46 of the magnets 28. The yoke 44 provides a path for magnetic flux to move between the magnets 28. As described in greater detail below, the yoke 44 is formed from a metallic material, such as, for example, a layer or strip 50 of stainless steel or other ferromagnetic materials that may be solid or laminated. The yoke 44 has a thickness 52 in a range of 3 to 5 millimeters. The strip 50 may have a thickness in a range of 0.5 to 1.0 millimeters.

A connecting layer 54 is positioned between the yoke 44 and the outer surfaces 46 of the magnets 28. As described in greater detail below, the connecting layer 54 may be formed from a ribbon or sheet of non-ferromagnetic material such as plastic. In other embodiments, the layer 54 may be formed from a thin plate or sheet of ferromagnetic material such as, for example, stainless steel.

In the illustrative embodiment, the rotor 12 includes 72 permanent magnets 28. The magnets 28 are magnetized to form a Halbach array of magnets that produces a stronger magnetic field toward the teeth 22 of the stator 14 and reduces or cancels the field directed away from the teeth 22. To do so, the permanent magnets 28 have a spatially rotating pattern of magnetization. For example, the permanent magnets 28 include a one magnet 60 having a magnetic field that is oriented in the direction indicated by arrow 62, another magnet 64 having a magnetic field that is oriented in the direction indicated by arrow 66, and a third magnet 68, which is positioned between magnets 60, 64, having a magnetic field that is oriented in the direction indicated by arrow 70. As shown in FIG. 1, the arrow 62 is pointed in the direction opposite the arrow 66, while the arrow 70 is pointed in a direction that is transverse to the arrows 62, 66. That exemplary arrangement is repeated throughout the magnets 28 of the rotor 12 such that the magnets 28 produce a stronger magnetic field toward the teeth 22 of the stator 14 and reduce or cancel the field directed away from the teeth 22. It should be appreciated that this is only an exemplary arrangement of a Halbach array and that other arrangements may be used to augment the magnetic field on one side of the rotor while cancelling or reducing the field on the opposite side.

The magnets 28, the layer 54, and the yoke 44 cooperate to define an annular ring, and the hub 32 is positioned in the center of that ring. The rotor 12 includes an outer shell 72 that secures the hub 32 to the permanent magnets 28, the connecting layer 54, and the yoke 44. The outer shell 72 is cylindrical and has a cup shape. As shown in FIG. 1, the opening 16, which is sized to receive the stator 14, is defined in the shell 72. The outer shell 72 is formed form a polymeric material, such as, for example, plastic, which is injection molded over the other parts to form the rotor 12. The process of making the rotor 12 is described in greater detail below.

Figure 2:
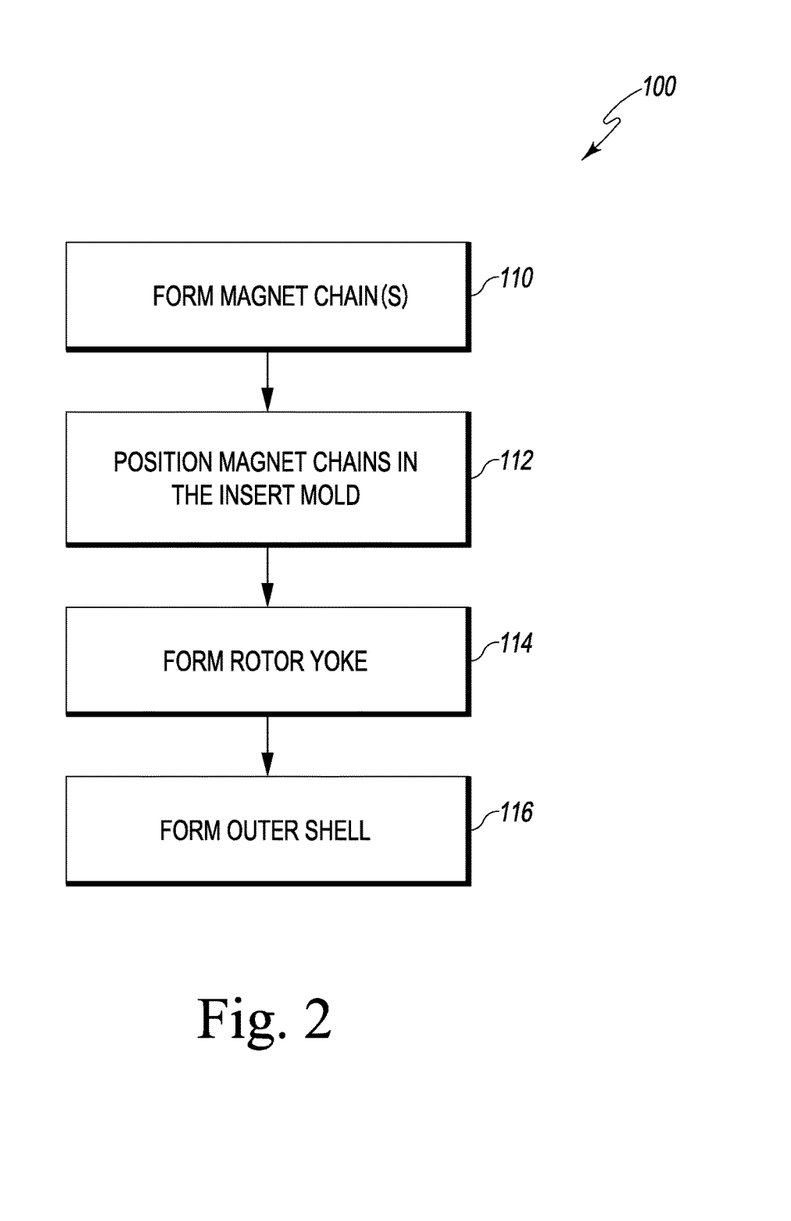
FIG. 2 is a flow chart of a method of manufacturing a rotor for the electric motor of FIG. 1.

Referring now FIG. 2, a method 100 of manufacturing the rotor 12 is illustrated. As shown in FIGS. 3-6, the rotor 12 may be manufactured by forming one or more magnet chains 80 and positioning the magnet chains 80 in an insert mold. The rotor yoke 44 may thereafter be positioned on the outer surface defined by the magnet chains 80. Thereafter, the outer shell 72 may be formed over the yoke 44 and the chains 80.

Figure 3:
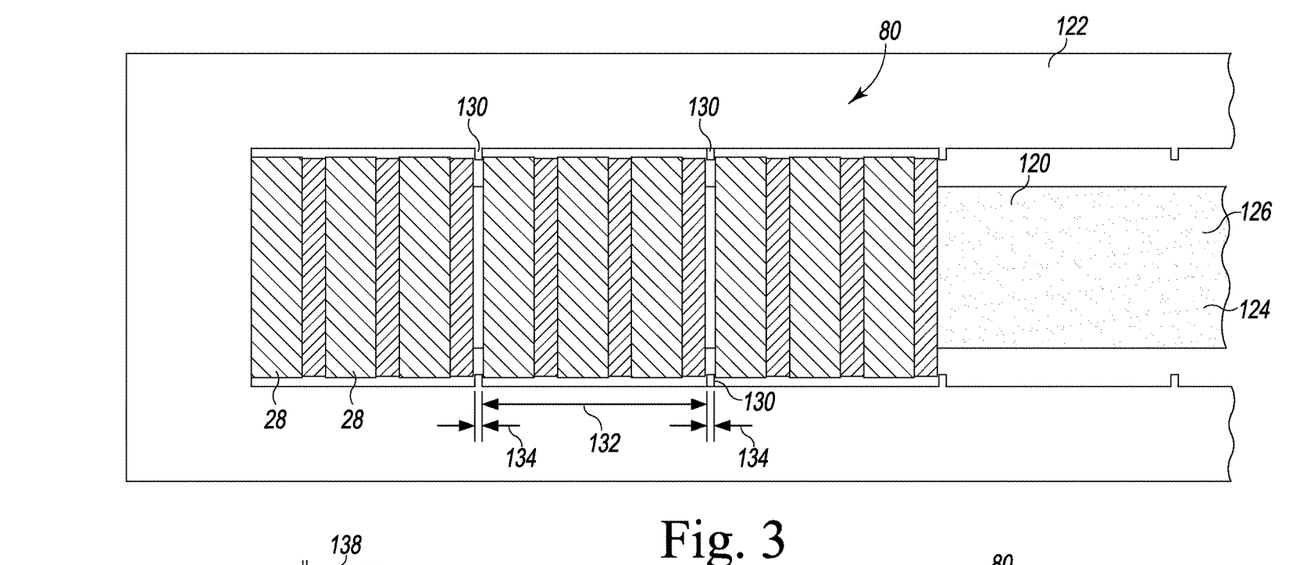
FIG. 3 is a top plan view of a magnet chain of the rotor of FIG. 1 positioned in a manufacturing frame.

In block 110 of the method 100, the permanent magnets 28 are attached to a ribbon or sheet 120 to form a magnet chain 80. As shown in FIG. 3, the sheet 120 is positioned in an alignment frame 122. In the illustrative embodiment, the sheet 120 is formed from a non-ferromagnetic material such as plastic or adhesive tape. In other embodiments, the sheet 120 may be formed from a thin plate or sheet of ferromagnetic material such as, for example, stainless steel. The sheet 120 is flexible and includes an upper surface 124 covered by an adhesive 126. Each magnet 28 is placed on the surface 124 of the sheet 120 in contact with the adhesive 126 to secure each magnet 28 to the sheet 120. It should be appreciated that the magnets 28 may be magnetized at any point in the process 100.

Figure 4:
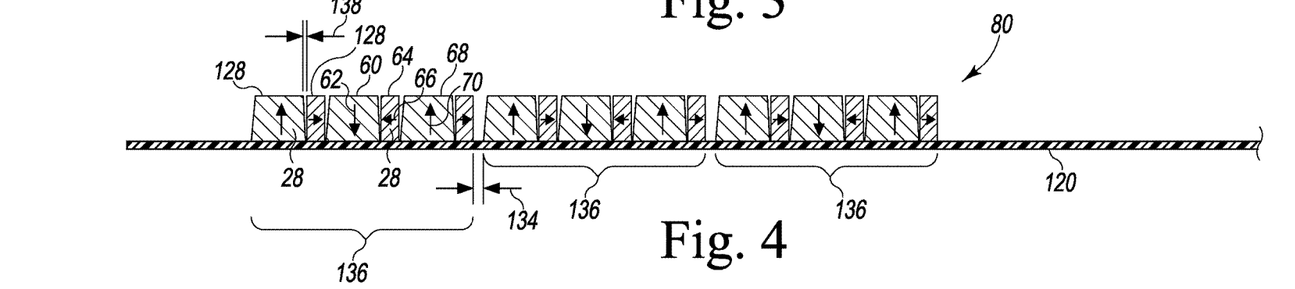
FIG. 4 is a side elevation view of the magnet chain of FIG. 3.

As described above, each magnet 28 is magnetized according to a spatially rotating pattern of magnetization. As a result, adjacent magnets 28 have magnetic fields that are oriented in different directions. For example, one magnet 60 has a magnetic field that is oriented in the direction indicated by arrow 62, another magnet 64 has a magnetic field that is oriented in the direction indicated by arrow 66, and a third magnet 68, which is positioned between magnets 60, 64, has a magnetic field that is oriented in the direction indicated by arrow 70. As shown in FIGS. 3-4, the arrow 62 is pointed in the direction opposite the arrow 66, while the arrow 70 is pointed in a direction that is transverse to the arrows 62, 66.

As described above, the sheet 120 is positioned in an alignment frame 122, which is used to accurately locate each magnet 28 according to the actual or expected orientation of its magnetic field. As shown in FIG. 3, the frame 122 includes a number of spacers 130, and a distance 132 is defined between each spacer 130. In the illustrative embodiment, the spacers 130 control the positioning of the magnets 28 on the sheet 120 such that gaps 134 are defined between different sets or groups 136 of magnets 28.

As shown in FIGS. 3-4, each group 136 of magnets 28 includes a total of six magnets 28, and the distance 132 corresponds to the total width of six magnets 28 arranged as shown in FIGS. 3-4. Each group 136 includes three trapezoidal-shaped magnets and three rectangular-shaped magnets. In other embodiments, the shape of each magnet in a group may be trapezoidal. Because of the trapezoidal-shape of every other magnet 28, a distance 138 is defined between the tip 128 of each magnet 28.

In the illustrative embodiment, each gap 134 is approximately 2 to 3 millimeters in length. It should be appreciated that in other embodiments each magnet group 136 may include additional or fewer magnets. In other embodiments, each gap 134 may be less than 2 millimeters or between 3 millimeters and 5 millimeters in length.

As described above, one or more magnet chains 80 may be formed in block 110. In the illustrative embodiment, four separate chains 80 are formed, with each chain 80 including a total of eighteen magnets 28. In that way, the rotor 12 includes an array of seventy-two magnets when assembled. In other embodiments, the magnets 28 may form a single chain 80. In still other embodiments, the number of chains 80 may be greater than four. After the necessary chains 80 are formed, the method 100 advances to block 112.

Figure 5:
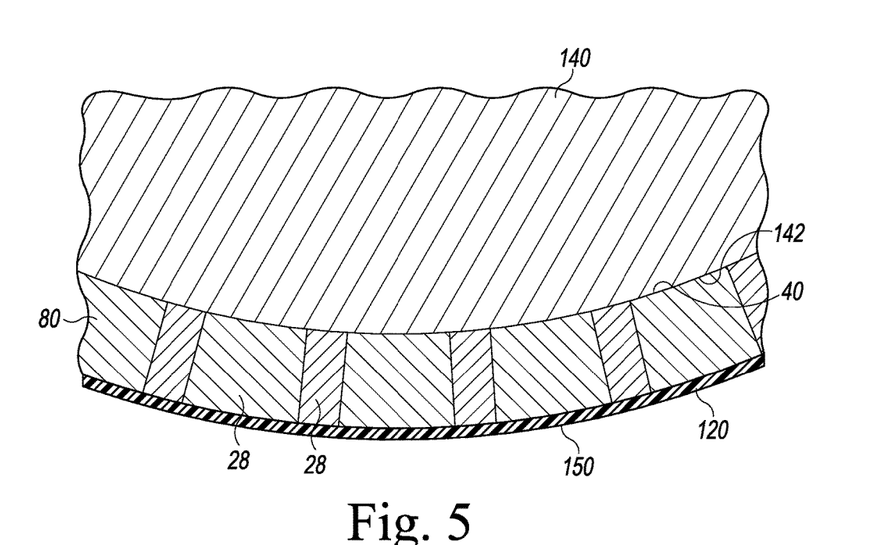
FIG. 5 is a top plan view of the magnet chain of FIG. 3 engaged with an insert mold.

In block 112, the magnet chains 80 formed in block 110 are positioned around an insert mold 140 of an injection molding machine. To position the magnet chains 80 in the mold 140, each sheet 120 is bent to wrap the chain 80 around the mold 140, as shown in FIG. 5. The flexibility of the sheet 120 compensates for any geometric variations in the size and shape of the magnets 28. As the sheet 120 is bent, the distance 132 defined between the tips 128 of adjacent magnets 28 are substantially eliminated.

The insert mold 140 has a cylindrical outer surface 142, which defines a diameter (not shown) corresponding to the desired inner diameter of the rotor 12. In the illustrative embodiment, the inner face 40 of each magnet 28 is pressed against the outer surface 142. As described above, the rotor 12 includes four separate chains 80, and each chain 80 is arranged around the mold 140 with the magnets 28 pressed against the surface 142 of the mold 140. In that way, the magnets 28 are properly positioned to define the desired inner diameter of the rotor 12. After the chains 80 are positioned in against the mold 140, the method 100 may advance to block 114.

Figure 6:
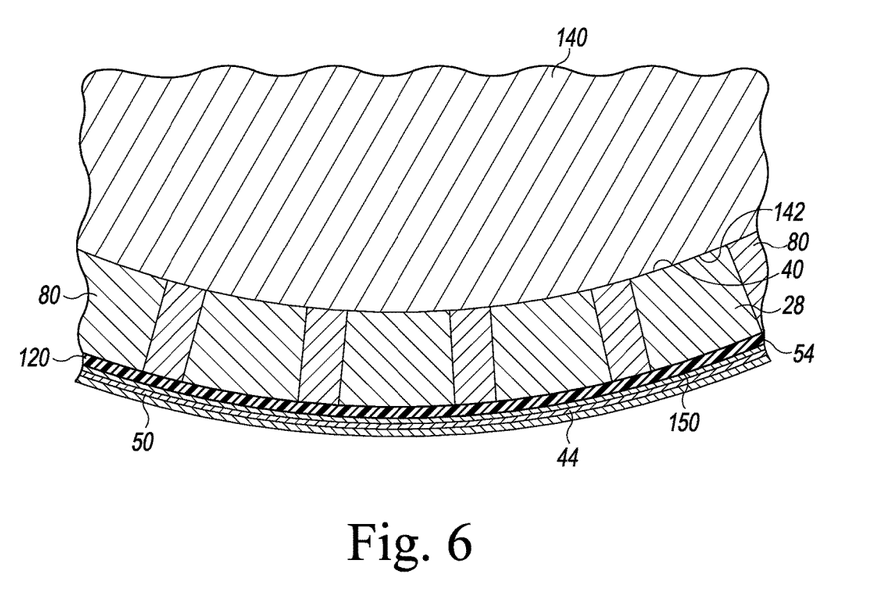
FIG. 6 is a view similar to FIG. 5 showing a rotor yoke positioned around the magnet chain.

In block 114, the rotor yoke 44 of the rotor 12 is formed. To do so, a plate or strip 50 is placed against the outer surface 150 of the sheets 120 of the chains 80. As shown in FIG. 6, the strip 50 may then be wrapped around the sheets 120 such that the sheets 120 define the connecting layer 54 between the yoke 44 and the magnets 28. The strip 50 is wrapped or coiled around the chains 80 to form a number of layers 152, as shown in FIG. 6. In the illustrative embodiment, the strip 50 is coiled at least three times around the chains 80. As described above, the strip 50 may have a thickness of one millimeter such that the resulting yoke 44 has a thickness 52 that is at least three millimeters. After the strip 50 is wrapped around the sheets 120, the strip 50 may be welded at one or more locations to lock the strip 50 in an annular shape. After the yoke 44 is formed in the mold 140, the method 100 may advance to block 116.

In block 116, the outer shell 72 of the rotor 12 is formed in an injection molding process. To do so, a polymeric or plastic material is injected into the mold 140 over the yoke 44 and the chains 80. The injected material also flows into the gaps 134 defined between the groups 136 of the magnets 28.

In the illustrative embodiment, the mold 140 also includes a central opening (not shown) sized to receive the hub 32 of the rotor 12. In that way, the hub 32 is secured to the outer shell 72 during the injection molding process. In other embodiments, the hub 32 may be secured to the outer shell 72 via fasteners or bolts. In other embodiments, the hub may be secured to the outer shell in a separate injection molding step. In still other embodiments, the hub may be formed from polymeric material and may be formed as a single, monolithic piece with the shell 72.

When the material cools, the outer shell 72 is formed over the yoke 44, chains 80, and hub 32, thereby securing the hub 32 to the magnets 28 and forming the rotor 12, as shown in FIG. 1. Because the faces 40 of the magnets 28 were engaged with the outer surface 142 of the mold 140, the faces 40 are free of polymeric material in the resulting rotor 12.

Figure 7:
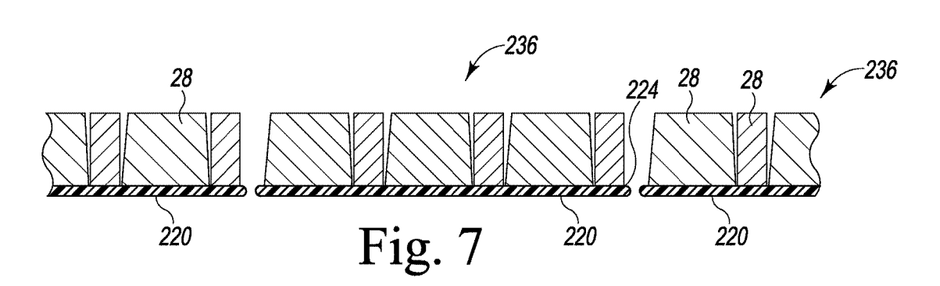
FIG. 7 shows another embodiment of a number of magnet chains of the rotor of FIG. 1.
Figure 8:
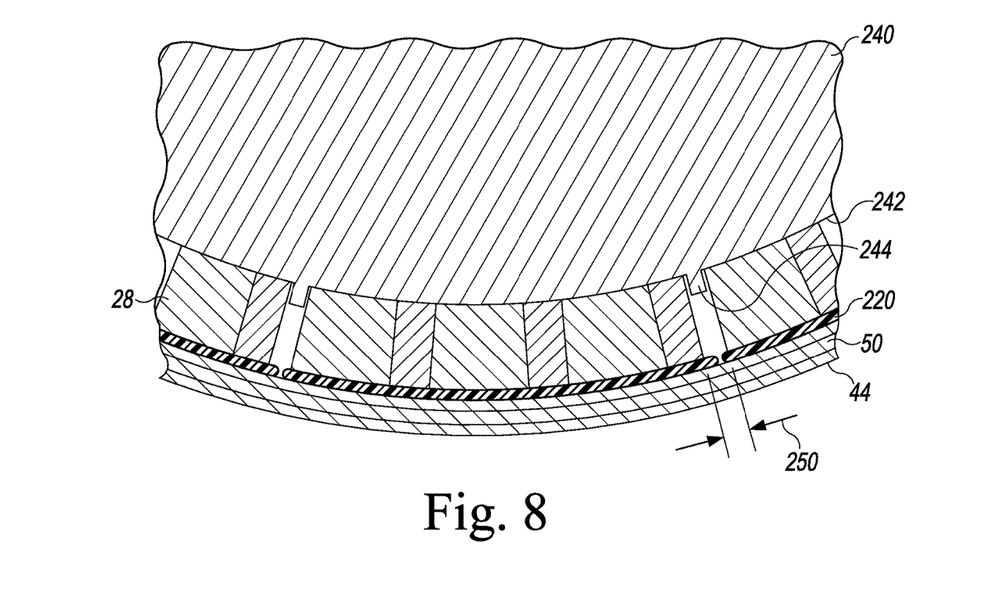
FIG. 8 is a top plan view of the magnet chains of FIG. 7 and a rotor yoke engaged with an insert mold.

Referring now to FIGS. 7-8, another method of manufacturing a rotor 12 is shown. As shown in FIG. 7, the magnets 28 may be positioned on a number of separate sheets 220 to form a number of chains 236 of magnets 28. In the embodiment of FIGS. 7-8, the sheets 220 are formed from a thin plate of ferromagnetic material rather than the non-ferromagnetic material described above in regard to FIGS. 2-6. The sheet 220 is flexible and includes an upper surface 224 covered by an adhesive (not shown) such as, for example, glue. Each magnet 28 is placed on the surface 224 of each sheet 220 in contact with the adhesive to secure each magnet 28 to the sheet 220. In the illustrative embodiment of FIGS. 7-8, a total of twelve chains 236 are formed, and each chain includes six magnets.

Similar to the sheet 120, the sheet 220 is flexible and configured to bend around an insert mold 240, as shown in FIG. 8. The insert mold 240 has a cylindrical outer surface 242, which defines a diameter (not shown) corresponding to the desired inner diameter of the rotor 12. In the illustrative embodiment, the inner face 40 of each magnet 28 is pressed against the outer surface 242. Each chain 236 is arranged around the mold 240 with the magnets 28 pressed against the surface 242 of the mold 240. In that way, the magnets 28 are properly positioned to define the desired inner diameter of the rotor 12.

As shown in FIG. 8, the mold 240 includes a plurality of spacers 244 extending outwardly from the outer surface 242. Each spacer 244 is positioned to define a gap 250 between each chain 236. Each spacer 244 has the same width such that the gaps 250 are substantially equal. In that way, consistently sized gaps 250 are defined between the chains 236 around the perimeter of the mold 240. In the illustrative embodiment, the gaps 250 are similar to the gaps 136 described above in regard to FIGS. 2-6.

After the chains 236 are positioned in against the mold 240, the rotor yoke 44 may be formed in the manner described above in regard to block 114 before the outer shell 72 is formed in the manner described above in regard to block 116.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A method of manufacturing a rotor of an electric motor, comprising:
   securing a plurality of permanent magnets to a sheet to form a magnet chain,
   bending the sheet to engage an inner surface of each permanent magnet with a curved outer surface of an insert mold,
   wrapping a metallic strip around an outer surface of the sheet to form a yoke of the rotor, and
   molding a polymeric material over the magnet chain and the yoke to form a cylindrical shell,
   wherein securing the plurality of permanent magnets to the sheet includes defining a space between a first set of magnets and a second set of magnets, and
   wherein the space is in a range of 2 and 3 millimeters.

2. The method of claim 1, wherein the magnet chain includes:
   a first permanent magnet having a first magnetic field,
   a second permanent magnet having a second magnetic field that has an orientation different from the first permanent magnet, and
   a third permanent magnet positioned between the first permanent magnet and the second permanent magnet, the third permanent magnet having a third magnetic field perpendicular to the first magnetic field and the second magnetic field.

3. The method of claim 2, wherein the magnet chain is a Halbach array of magnets.

4. The method of claim 1, wherein securing the plurality of permanent magnets to the sheet includes positioning each magnet in contact with an adhesive on the sheet.

5. The method of claim 4, wherein the sheet is formed from a non-ferromagnetic material.

6. The method of claim 1, further comprising:
   positioning the sheet in a frame having a plurality of spacers, and
   defining the space between the first set of magnets and the second set of magnets including inserting the spacer between the first set and the second set.

7. The method of claim 1, wherein the first set of magnets includes six magnets.

8. The method of claim 1, wherein the yoke includes multiple layers of the metallic strip.

9. The method of claim 1, wherein:
   the magnet chain and the yoke cooperate to define an annular ring, and
   molding the polymeric material over the magnet chain and the yoke includes molding the polymeric material over a hub positioned at a center of the annular ring.

10. The method of claim 9, wherein the hub includes a plurality of teeth configured to receive a drive shaft of the electric motor.

11. The method of claim 1, wherein the sheet is formed from a ferromagnetic material.

12. The method of claim 1, wherein bending the sheet to engage the inner surface of each magnet with the curved outer surface of the insert mold includes defining a space between a first set of magnets and a second set of magnets.

13. The method of claim 1, further comprising:
   attaching a second number of magnets to a second sheet to form a second magnet chain,
   bending the second sheet to engage an inner surface of each permanent magnet of the second magnet chain with the curved outer surface of the insert mold,
   wherein the metallic strip is also wrapped around an outer surface of the second sheet,
   wherein the polymeric material is also over the second magnet chain.

14. A method of manufacturing a rotor of an electric motor, comprising:

securing a plurality of permanent magnets to a sheet to form a magnet chain,
bending the sheet to engage an inner surface of each permanent magnet with a curved outer surface of an insert mold,
wrapping a metallic strip around an outer surface of the sheet to form a yoke of the rotor, and
molding a polymeric material over the magnet chain and the yoke to form a cylindrical shell,
wherein securing the plurality of permanent magnets to the sheet includes defining a space between a first set of magnets and a second set of magnets, and
wherein defining the space between the first set of magnets and the second set of magnets includes positioning a spacer between the first set of magnets and the second set of magnets.

15. A method of manufacturing a rotor of an electric motor, comprising:
securing a plurality of permanent magnets to a sheet to form a magnet chain,
bending the sheet to engage an inner surface of each permanent magnet with a curved outer surface of an insert mold,
wrapping a metallic strip around an outer surface of the sheet to form a yoke of the rotor, and
molding a polymeric material over the magnet chain and the yoke to form a cylindrical shell,
wherein:
the yoke includes multiple layers of the metallic strip,
the metallic strip has a thickness in a range of 0.5 and 1.0 millimeters, and
the yoke has a thickness in a range of 3 to 5 millimeters.

16. A method of manufacturing a rotor of an electric motor, comprising:
securing a plurality of permanent magnets to a sheet to form a magnet chain,
bending the sheet to engage an inner surface of each permanent magnet with a curved outer surface of an insert mold,
wrapping a metallic strip around an outer surface of the sheet to form a yoke of the rotor, and
molding a polymeric material over the magnet chain and the yoke to form a cylindrical shell,
wherein bending the sheet to engage the inner surface of each magnet with the curved outer surface of the insert mold includes defining a space between a first set of magnets and a second set of magnets, and
wherein defining the space between the first set of magnets and the second set of magnets includes positioning a spacer that extends from the curved outer surface of the insert mold between the first set of magnets and the second set of magnets.

* * * * *